United States Patent [19]

Ausnit

[11] Patent Number: 4,703,518
[45] Date of Patent: Oct. 27, 1987

[54] ATTACHMENT OF PLASTIC ZIPPER TO THE OUTSIDE OF INCOMPATIBLE BAG WALL WEB

[75] Inventor: Steven Ausnit, New York, N.Y.

[73] Assignee: Minigrip, Inc., Orangeburg, N.Y.

[21] Appl. No.: 895,309

[22] Filed: Aug. 11, 1986

Related U.S. Application Data

[62] Division of Ser. No. 769,894, Aug. 27, 1985.

[51] Int. Cl.$^4$ .............................................. B65D 33/24
[52] U.S. Cl. ...................................... 383/63; 24/462; 24/576; 156/66; 383/68; 383/107; 428/139; 493/214
[58] Field of Search ....................... 383/63, 65, 69, 93, 383/95, 68, 107; 493/193, 214; 156/66, 303.1; 428/139, 140; 24/460, 462, 576, 587, 559

[56] References Cited

U.S. PATENT DOCUMENTS

| | | | |
|---|---|---|---|
| Re. 28,969 | 9/1976 | Naito . | |
| 2,542,245 | 2/1951 | Gottesman . | |
| 2,791,807 | 5/1957 | Morin | 383/63 X |
| 2,914,936 | 12/1959 | Reinold | 24/576 X |
| 2,978,769 | 4/1961 | Harrah | 383/65 X |
| 3,198,228 | 8/1965 | Naito | 383/65 |
| 3,346,883 | 10/1967 | Ersek | 383/63 X |
| 3,893,212 | 7/1975 | Carry . | |
| 4,339,488 | 7/1982 | Brolemann | 428/139 X |
| 4,341,575 | 7/1982 | Herz | 156/66 |
| 4,430,070 | 2/1984 | Ausnit | 493/215 |

FOREIGN PATENT DOCUMENTS 312954 4/1956 Switzerland .

Primary Examiner—Stephen Marcus
Assistant Examiner—Bryon Gehman
Attorney, Agent, or Firm—Hill, Van Santen, Steadman & Simpson

[57] ABSTRACT

Disclosed are bags especially adapted to be made from plastic material and in which the bag body film or material and extruded plastic zippers are fusibly incompatible. A pair of extruded plastic zipper strips having reclosable zipper profiles facing toward one another along the lower sides of pull flanges of the bag have the opposite ends of the strips sandwiching opposite side seal seams of the bag therebetween. The opposite side seal seams have holes therethrough, and fused connecting anchors formed from the material of the zipper strip ends extend through the holes. The bag may be closed by squeezing the zipper strips together so that the profiles interlock with one another and interlock the intervening area of the bag walls therebetween. A method of making the bags is also disclosed.

9 Claims, 4 Drawing Figures

ATTACHMENT OF PLASTIC ZIPPER TO THE OUTSIDE OF INCOMPATIBLE BAG WALL WEB

RELATED U.S. APPLICATION DATA

Division of Ser. No. 769,894, Aug. 27, 1985.

BACKGROUND OF THE INVENTION

This invention relates to the art of bag making, and is more particularly concerned with bags having reclosable zippers of the extruded complementary rib and groove type.

Heretofore, numerous and varied bag structures of this type have been proposed and some have achieved substantial commercial success.

For example, U.S. Pat. No. Re. 28,969 discloses a bag structure in which the bag body web and the zipper profiles are extruded in one piece and the bag has pull flanges which project outwardly relative to the zipper.

In U.S. Pat. No. 4,430,070, the zipper is fusibly attached to the bag wall web spaced inwardly from the pull flanges which project outwardly from the zipper.

Both of these examples require that the bag body web and the zipper profiles be fusibly compatible, that is that one can be fused onto the other by some sort of heat sealing means.

On the other hand, U.S. Pat. No. 4,341,575 is representative of disclosures wherein zipper strips are attached to the bag wall web by adhesive means, and which would permit fusibly incompatible materials to be used. However, it will be noted that this disclosure requires fairly critical parameters in the adhesive attachment to avoid separation of the elements. Adhesive attachment generally involves some messiness due to the necessary manner of application of the adhesive to the elements.

Fused attachment of the elements is generally preferred, but presents a problem where the zipper strips and the bag body web are fusibly incompatible. For example, while polypropylene may be fused to polypropylene, and polyethylene may be fused to polyethylene, there is great difficulty encountered in any attempt to fuse or heat seal polyethylene to polypropylene. In bags, while polyethylene is widely used, both for the bag body web material and also for the profiled zipper strips, for one thing because of the ease of extruding such material, the polyethylene material does not afford the imperviousness that is frequently desired where fluid barrier is required. Sometimes, also, other web material incompatible to fusing together with polyethylene may be desired, while the profiled zipper strips should be extruded from polyethylene.

It is to the problem of making bags from fusibly incompatible bag body web material and extruded plastic profile zipper strips that the present invention is directed.

In the prior art, there has been the suggestion in U.S. Pat. No. 2,791,807 that separable fasteners with stringers be constructed of extruded plastic profile fasteners attached to fabric stringer tapes so that the plastic strips may be attached by sewing the fabric tape stringers to the articles to which the fastener strips are to be secured. The structure in that patented disclosure does not lend itself to embodiment in bags, and more particularly bags made from plastic wall web material, and provided with pull flanges at their open tops.

Attention is also directed to Swiss Patent No. 312,954 of 1956 directed to attachment of zipper to sheet material, and U.S. Pat. Nos. 2,542,245 of 1951 and 2,914,936 of 1959, both of which are directed to connecting incompatible materials. None of these patents relates to the art of making bags equipped with extruded profiled plastic zipper strips.

SUMMARY OF THE PRESENT INVENTION

It is, accordingly, an important object of the present invention to provide a new and improved bag structure made from fusibly incompatible bag wall web material and extruded plastic zipper and in which the bags are provided with pull flanges.

Another object of the invention is to provide bag structure as just indicated in which the fusibly incompatible bag wall web material and the extruded zipper are secured together by fusibly locking parts of the zipper to one another for securing the zipper to the bag wall web.

A further object of the invention is to provide a new and improved bag structure having plastic film walls and wherein the zipper comprises zipper strips on the outside of the bag for securing the bag walls together.

According to the present invention there is provided a bag made from thin web material and having opposite walls with at least opposite sides closed and the walls providing an openable top flanked by opposed upwardly projecting pull flanges, and comprising extruded plastic zipper strips extending along lower sides of said pull flanges, the material of the bag walls and of the zipper strips being fusibly incompatible, one of said strips being located along the outside of one of said bag walls and the other of said strips being located along the outside of the opposite bag wall, complementary separably interlockable zipper profiles of said zipper strips facing toward one another, the profiles being interlockable by compressing the zipper strips toward one another and engaging and interlocking the material of the bag walls therebetween coincident with interlocking of the profiles with one another, and the bag having side seal seams with holes therethrough, and fused anchors securing the ends of said zipper strips together through said holes so that the zipper profile strips are attached to the bag without affecting the integrity of the side seal seams.

A new and improved method is provided for making the bag structure.

BRIEF DESCRIPTION OF THE DRAWINGS

Other objects, features and advantages of the invention will be readily apparent from the following description of a representative embodiment thereof, taken in conjunction with the accompanying drawing, although variations and modifications may be effected without departing from the spirit and scope of the novel concepts embodied in the disclosure, and in which.

DETAILED DESCRIPTION

Throughout the description, it will be understood that various parts of the structure may, for illustrative purposes, be dimensionally exaggerated and that, as a matter of fact, cross sectional dimensions as well as some other dimensions may in actual practice be on a much smaller scale. Dimensions may vary, as is well known in this art, depending upon strength factors required, uses to which the ultimate bags may be put, etc.

Figure 1:
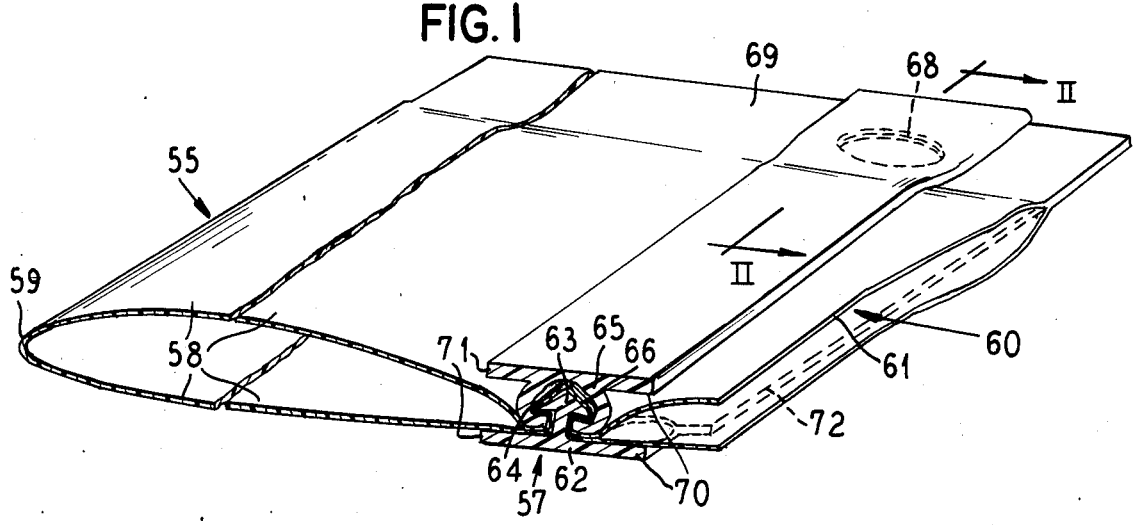
FIG. 1 is a fragmentary perspective view showing bag making material embodied in a bag, and embodying the present invention.

For some purposes, it may be desirable, or at least more convenient, to provide bag structure 55 (FIG. 1) with a zipper 57 located on the outside of the bag instead of on the conventional inside of the bag. The bags may provide the general advantages of bags which are not only pilfer proof, but also provide a secure barrier for the contents. To this end, the bag 55 has a web body providing side walls 58 folded to provide a bottom closure fold 59. A top opening 60 is flanked by pull flanges 61, extending to a desirable width above the location of the zipper 57. Secure barrier film for the bag body is generally of a material such as polyproplyene which is fusibly incompatible with the usual materials such as polyethylene from which the zipper 57 is preferably extruded.

The zipper 57 comprises an extruded zipper strip 62 having a generally arrow shaped cross section male profile rib 63 adapted to snap into retaining enterengagement in a complementary grooved profile 64 carried by a zipper strip 65. In this arrangement, the bag body walls 58, which are of an adequately thin film section, are pinched together and an intervening area 66 of the pinched walls forced into the interlocked profiles of the zipper 57, substantially as shown. It will be understood, of course, that the resilient stiffness of the complementary zipper profiles 63 and 64, and the thinness of the bag walls 58 will conveniently permit such pinching and interlocking of the bag wall material 66 in the zipper along the inner sides of the pull flanges 61, by simply squeezing the zippers profiles 62 and 65 toward one another and snapping them together. In addition, the integrity of the bag wall barrier film has not been affected since the zipper is attached to the bag wall film outside of the seals enclosing the bag contents.

For attaching the zipper 57 to the bag 55, the opposite ends of the zipper strips 62 and 64 are anchored together at each side of the bag by means of a respective fused anchors 67 extending through anchor holes 68 in fused cross seals 69 running along the respective sides of the bag. Although the zipper strips 62 and 65 are not attached to the bag walls 58 except by means of the anchors 67 in the side seals 69, there is a secure connected relation of the zipper to the bag.

By having the zipper strips 62 and 65 equipped with respective upwardly projecting base flanges 70 and coplanar downwardly projecting base flanges 71, there is adequate vertical (considered with the bag 58 having its top end extending upwardly) resistence to relative deformation of the zipper strips when the zipper is open, so that when it is desired to close the bag 55, the profiles 63 and 64 of the zipper will be conveniently aligned to be forced together manually for lockingly closing the top of the bag. When it is desired to open the bag 55, the pull flanges 61 and the upper zipper strip base flanges 70 are pulled apart to unsnap the zipper.

Although for some purposes the sealed relation attained across the top of the bag 55 by the pinching of the bag wall material 66 within the closed zipper 57 may be adequate, there may be occasions where a more thorough, hermetic, seal is desired. In such event, the pull flanges 61 may be sealed together along their top edge portions as indicated at 72. Such pull flange seals 72 not only serve as barrier seals but also as pilferproof seals. When it is desired to open the bag 55, these seals 72 may be snipped off or ripped off or otherwise opened for access into the bag, which may be reclosed by means of the zipper 57 carried by the bag.

Figure 3:
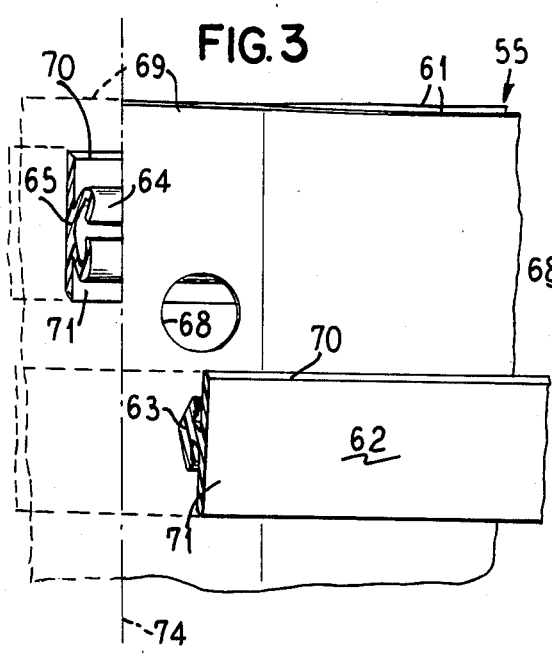
FIG. 3 is a fragmentary assembly view showing how the parts of the structure of FIG. 1 are adapted to be brought together.
Figure 4:
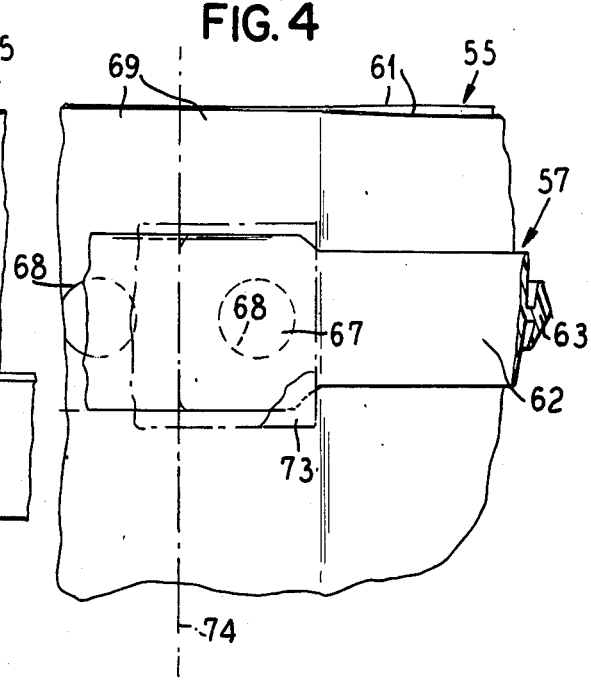
FIG. 4 is a schematic fragmentary view demonstrating how the parts of FIG. 3 are finally secured together.

FIGS. 3 and 4 demonstrate steps in applying the zipper strips 62 and 65 to the bag 55. This may be done in a continuous assembly method, wherein the bag film material is advanced in a continuous ribbon which is folded longitudinally upon itself to provide the closed bag bottom 59 along one longitudinal edge of the folded ribbon and the pull flanges 61 along the opposite longitudinal edge of the ribbon. The respective bags are then delineated by forming the side heat seal seams 69 of double width across the ribbon at bag width sections or intervals, and the bag sections may remain connected in a ribbon or chain series. Such sealing may be effected in any usual manner.

Figure 2:
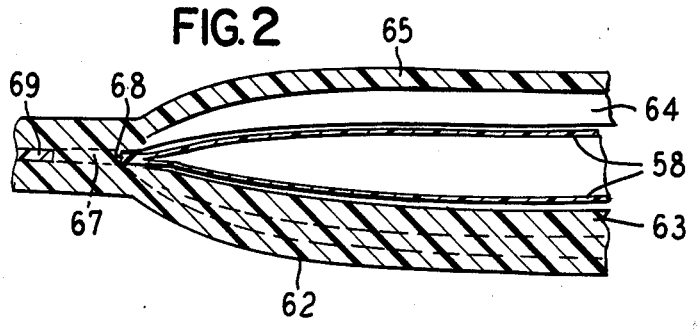
FIG. 2 is an enlarged fragmentary sectional detail view taken substantially along the line II—II in FIG. 1.

Anchor holes 68 are formed in longitudinally spaced pairs in the side seal seams 69 so that each bag section will have the holes 68 in each of its side seams. Zipper strips 62 and 65 derived from suitable source as continuous strips are brought into assembly with the bag section ribbon substantially as shown in FIG. 3 in longitudinal alignment with one another on opposite bag wall faces of the bag ribbon and also aligned with the anchor holes 68. By means of suitable heat sealing, ultrasonic head and anvil means, or the like, schematically identified at 73 in FIG. 4, the portions of the ziper strips 62 and 64 which sandwich the bag side seal seams 69 therebetween are fused together into the configuration represented in FIG. 2 whereby the attachment anchors 67 are formed to extend through the anchor holes 68.

Thereafter, the continuous strip of bags 55 may be rolled up or folded, or otherwise packed for shipment to a filling site or machine for filling, or may be filled directly after being made as described. The bags may, after filling, be sealed by closing the zipper 57 and thereby pinching the bag wall material 66 within the closed zipper. Alternatively, or in addition, the pull flanges 61 may be sealed together at their upper edges 72. The sealed and closed bags may then be separated from one another along median separation lines 74 (FIGS. 3 and 4), bisecting the two halves of each of the side seals 69. If desired, of course, the bags may be separated from one another along the lines 74 before they are filled where they are to be used in a manual individual bag use mode. If desired, all of the steps of the method as described may be combined in a form fill and seal machine as a continuous process.

It will be understood that variations and modifications may be effected without departing from the spirit and scope of the novel concepts of the present invention.

I claim as my invention:

1. In a bag comprising a thin web material body having opposite walls providing a bottom end, side seal seams and an openable top flanked by opposed upwardly projecting pull flanges:

extruded plastic zipper means comprising a pair of strips having complementary reclosably interlockable zipper profiles having the profiles facing toward one another and the strips located in alignment along lower sides of said pull flanges;

one of said strips being mounted on the outside of one wall of the bag body and the other of said zipper strips being mounted along the outside of the opposite wall of the bag body;

said material of said bag body and the material of said zipper strips being fusibly incompatible;

said side seams having holes therethrough; and fused anchors securing the ends of said zipper strips together through said holes so that the strips are attached to said bag body without affecting the integrity of the bag walls or said side seal seams, so that said zipper strip profiles interlockably interengage and pinch the area of the bag walls between the strips into the interlocked profiles and thereby hold the bag top closed.

2. A bag according to claim 1, wherein said zipper strips have base flanges serving to cooperate with said pull flanges for effecting separation of said profiles by pulling said pull flanges and said base flanges apart.

3. A bag according to claim 1, wherein said zipper strips have stabilizing base flanges.

4. A bag according to claim 3, wherein said stabilizing flanges cooperate with said pull flanges for opening the bag when the bag is closed by interlocking of said profiles and pinching of the intervening bag wall material within the profiles.

5. A bag according to claim 1, wherein the upper edges of said pull flanges are sealed together.

6. A method of making a bag equipped with extruded plastic reclosable zipper means, comprising:

forming a bag body from thin web material and having a bottom end, closed sides and an openable top flanked by opposed upwardly projecting pull flanges;

providing said bag sides with side seams;

providing extruded plastic zipper strips and comprising a pair of opposed strips located in alignment on opposite outside faces of said bag body with complementary reclosably interlockable zipper profiles of the strips facing toward one another with an area of the bag body material intervening between said strips so that the strips can be squeezed together with the intervening material locked in the profiles;

assembling said profile strips with the bag body and with opposite ends of the strips sandwiching sides of the bag therebetween;

forming holes in said side seams aligned with said strip ends; and fusing connecting anchors from the end portions of the strips through said holes for thereby attaching said opposite ends of said strips to said bag sides.

7. A method according to claim 6, which comprises sealing the top ends of said pull flanges together.

8. A method according to claim 6, which comprises providing said zipper strips with stabilizing flanges.

9. A method according to claim 6, which comprises providing said zipper strips with flanges cooperative with said pull flanges for opening the zipper after the zipper has been closed.

* * * * *